UNITED STATES PATENT OFFICE.

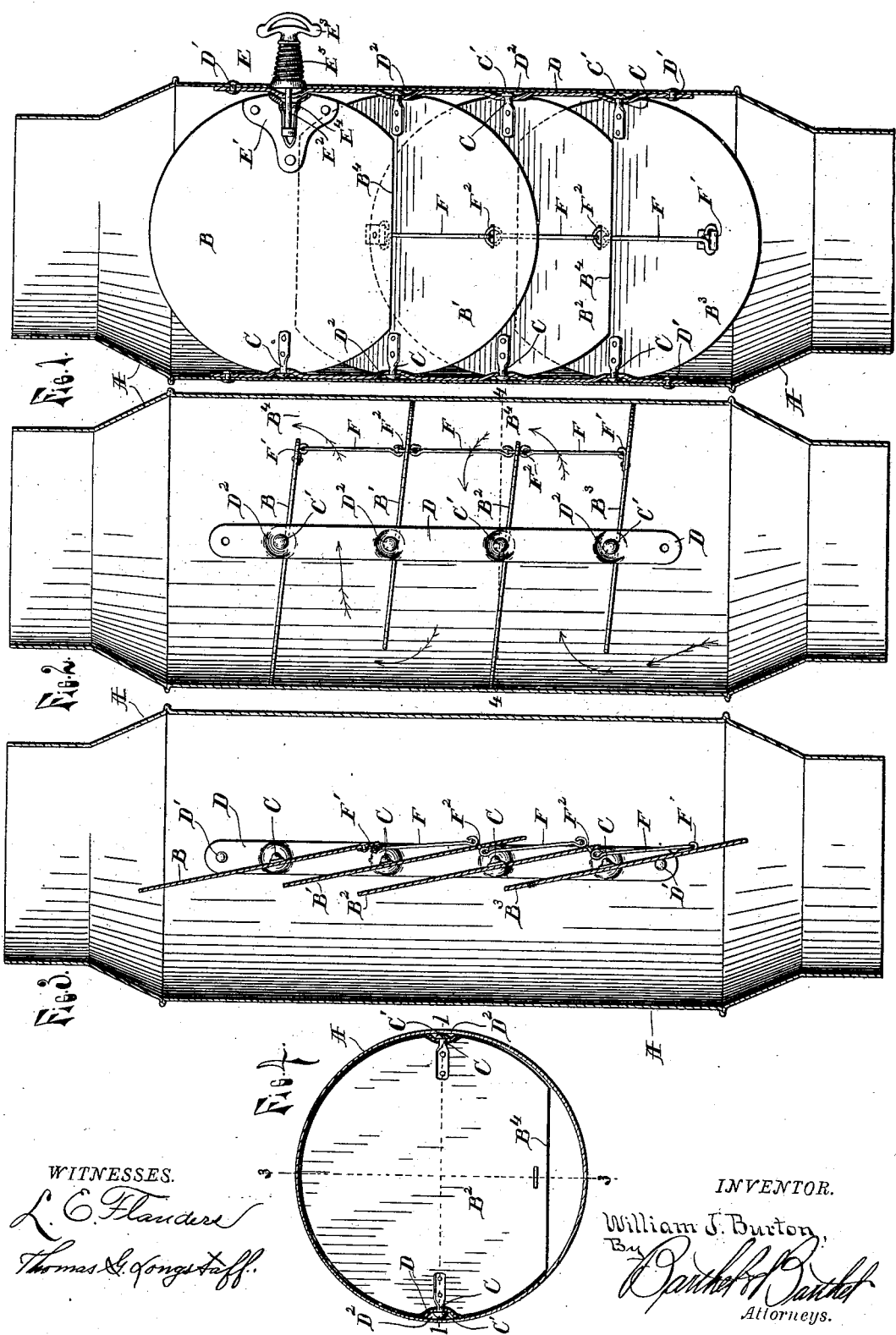

WILLIAM J. BURTON, OF DETROIT, MICHIGAN.

HEATING-DRUM.

SPECIFICATION forming part of Letters Patent No. 713,055, dated November 11, 1902.

Application filed March 17, 1902. Serial No. 98,461. (No model.)

*To all whom it may concern:*

Be it known that I, WILLIAM J. BURTON, a citizen of the United States of America, residing at Detroit, in the county of Wayne and State of Michigan, have invented certain new and useful Improvements in Heating-Drums, of which the following is a specification, reference being had therein to the accompanying drawings.

My invention relates to improvements in heating devices; and its object is to provide a drum having a cylindrical casing which may be inserted in the line of stovepipe at any desired point and a series of discous dampers within said casing operated by a suitable handle and connected to turn simultaneously to a substantially vertical position to allow the heated air and products of combustion to pass freely therethrough and to a horizontal position to retard the air by causing it to follow a tortuous passage; and it consists in the peculiar arrangement, construction, and combination of parts hereinafter more fully described, and particularly pointed out in the claims, reference being had to the accompanying drawings, in which—

Figure 1 is a longitudinal section on the line 1 1 of Fig. 4 of a device embodying my invention with the dampers in the position shown in Fig. 3. Fig. 2 is a longitudinal section of the casing, showing the dampers and supporting-strips in side elevation. Fig. 3 is a section on the line 3 3 of Fig. 4, and Fig. 4 a section on the line 4 4 of Fig. 2.

A is a suitable cylindrical casing of sheet metal reduced at each end to connect with an ordinary stovepipe, so that it may be inserted at any desired point in a line of such pipe, and B B' B² B³ are discous damper-plates of a size to fit closely within the pipe, a segment of each plate being cut away at one side thereof, as at B⁴, to allow the gases to pass and provided with trunnions C, upon which said plates turn. To furnish bearings for the trunnions, perforated strips D of sheet metal are secured by rivets D' to the casing, and to prevent the trunnions from escaping from the perforations forming their bearings said trunnions are provided with heads C', which engage countersinks or depressions D² at the points of perforation in the strips D. The heads thus lying within the depressions do not prevent the strips contacting the sides of the casing; but to thus form said strips with the depressions in their outer surface raises protuberances on their inner surface, and that the damper-plates may fit closely within the casing semicircular portions are cut away at each side of the plates to fit the protuberance. By forming the bearings for the trunnions on these separate strips the necessity of making holes in the casing therefor is avoided, and the damper-plates may be secured in the bearings in operative position before being inserted in the casing, thus greatly facilitating the manufacture.

In place of one of the trunnions of the upper damper-plate B a suitable operating and holding device E of any well-known construction may be provided, the device shown consisting of a casting E', secured to the damper-plate and having a socket to receive the rod E², which rod is provided with a handle E³ at its outer end and lugs E⁴ to engage the casting E' to turn the damper, a spring E⁵ being sleeved on said rod between the handle and the casing A to hold the lugs engaged with the casting and to create a frictional resistance to the turning of the dampers.

The dampers are connected by the rods F to turn simultaneously, the damper-plates B and B³ being provided with eyes F', engaged by said rods, and the intermediate dampers B' and B² being slotted to receive rings F², to which said rods are pivotally connected. Said rings are free to move slightly through the slots in the plates and also to tilt, such movement being limited by the eyes on the rods with which the rings are in engagement. By thus connecting the plates less accuracy is required in determining the length of the rods and in connecting the plates and a cheaper construction is secured. The damper-plates are cut away at alternate sides—that is, the plates B and B² are cut away at their sides, which are connected by the rods F, while the plates B' and B³ are cut away at the sides opposite those so connected—so that when the plates are turned to their horizontal position, or transversely of the casing, the heated gases and products of combustion are forced to pass from one side to the other of the casing in a tortuous course, and are thus retarded in their flow and caused to give off the heat and when turned to extend longitudinally of the casing lie closely together with overlapping sides and present no obstruction to the draft.

What I claim as my invention is—

1. In a heating-drum, the combination with a cylindrical casing, of perforated strips depressed at their outer sides and having protuberances on the inner sides at each point of perforation, a series of discous damper-plates portions of which are cut away at alternate sides of the plates and semicircular portions cut away adjacent to the protuberances, trunnions on said damper-plates engaging the perforations in said strips, and heads on said trunnions engaging the depressions.

2. In a heating-drum, the combination of a cylindrical casing having reduced ends and adapted to be inserted in a line of pipe leading from a heater, sheet-metal strips extending longitudinally of said casing and having perforations and formed with depressions on their outer sides and protuberances on their inner sides at each point of perforation, a series of discous damper-plates having segmental portions cut away at alternate sides of the plates and semicircular portions cut away opposite each protuberance on the said strips, the intermediate plates of the series being provided with slots near one side, trunnions on said damper-plates, heads on said trunnions, rods pivoted to the upper and lower damper-plates, rings engaging the slots in said intermediate plates and engaged by eyes on said rods, a rod connecting the two rings, and means for operating said damper-plates secured to one of the same.

In testimony whereof I affix my signature in presence of two witnesses.

WILLIAM J. BURTON.

Witnesses:
OTTO F. BARTHEL,
LEWIS E. FLANDERS.